(12) United States Patent
Shiraki et al.

(10) Patent No.: US 6,618,569 B2
(45) Date of Patent: Sep. 9, 2003

(54) IMAGE FORMING APPARATUS CAPABLE OF FORMING TWO IDENTICAL IMAGES ON AN INTERMEDIATE TRANSFER MEMBER

(75) Inventors: Seiji Shiraki, Iwatsuki (JP); Tomoyuki Yamada, Iwatsuki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/840,092

(22) Filed: Apr. 24, 2001

(65) Prior Publication Data
US 2001/0033759 A1 Oct. 25, 2001

(30) Foreign Application Priority Data
Apr. 25, 2000 (JP) .................................. 2000-124273

(51) Int. Cl.[7] .............................................. G03G 15/01
(52) U.S. Cl. ..................................................... 399/302
(58) Field of Search ................................. 399/204, 302, 399/308, 383, 38, 145

(56) References Cited
U.S. PATENT DOCUMENTS 3,752,573 A * 8/1973 Miller ........................ 399/145
4,142,792 A * 3/1979 Satomi et al. ................ 399/38
4,381,147 A * 4/1983 Kasamura ............... 399/145 X
5,159,390 A * 10/1992 Imaizumi ................... 399/204
5,870,648 A * 2/1999 Sakaki et al. ................ 399/66
5,930,571 A * 7/1999 Ito ............................. 399/302
6,263,174 B1 * 7/2001 Fuchiwaki et al. ..... 399/302 X
6,320,674 B1 * 11/2001 Soma et al. ........... 399/383 X

FOREIGN PATENT DOCUMENTS

| JP | A 3-154072 | 7/1991 |
| JP | A 3-154076 | 7/1991 |
| JP | 5-323704 | * 12/1993 |

* cited by examiner

Primary Examiner—Fred L. Braun
(74) Attorney, Agent, or Firm—Oliff & Berridge, PLC

(57) ABSTRACT

An image forming apparatus capable of forming two identical images on an intermediate transfer member is provided. Image data read by a reading portion is stored in a memory portion, and two identical images are formed on an intermediate transfer member in a period in which the intermediate transfer member makes one rotation.

2 Claims, 8 Drawing Sheets

PRIOR ART

IMAGE FORMING APPARATUS CAPABLE OF FORMING TWO IDENTICAL IMAGES ON AN INTERMEDIATE TRANSFER MEMBER

BACKGROUND OF THE INVENTION

1. Field of the Invention

The present invention relates to an image forming method and apparatus, and particularly to an image forming method and apparatus in which efficiency of image formation is improved.

2. Description of the Related Art

In an image forming apparatus using an intermediate transfer member, such as a color copying machine, a single color image is developed several times and transfer is carried out while colors are superimposed on the intermediate transfer member at the same time. When images of all colors are transferred onto the intermediate transfer member and a final color image is formed, the image is transferred onto a transfer sheet, the image on the transfer sheet is fixed by a fixing device, and the transfer sheet is discharged to the outside of the apparatus.

In this case, each time an image is developed, a read operation of an original document is performed, and read data is converted into single color data for print. For example, in the case where printing is performed with four colors of yellow, magenta, cyan and black in an image forming apparatus having a structure as shown in FIG. 7, when a copy start operation is made by an operation portion 105, a control portion 104 controls a read portion 101 and the like to start an operation. First, image data of yellow is outputted from an image processing portion 102 by a first read operation of the read portion 101, and an image of yellow is formed on a photoreceptor in a print portion 103. With a slight delay, the formed image is transferred from the photoreceptor onto the intermediate transfer member.

When the intermediate transfer member makes one rotation and again returns to the original position, the read portion 101 performs a second read operation, and by this, image data of magenta is outputted from the image processing portion 102. In the print portion 103, an image of magenta is formed on the photoreceptor, and with a slight delay, the formed image of magenta is transferred from the photoreceptor onto the intermediate transfer member.

When formed images of cyan and black are transferred onto the intermediate transfer member in the same manner, the images on the intermediate transfer member are transferred onto a transfer sheet, and the transfer sheet is subjected to image fixation by a fixing device and is discharged to the outside of the apparatus.

In such an image forming apparatus, each time the intermediate transfer member makes one rotation, only image formation for one color of one transfer sheet can be performed. On this account, even in the case where image formation to a small transfer sheet is performed, since image formation of a next color can not be performed until the intermediate transfer member makes one rotation and returns to the original position, the efficiency is poor. For example, in the case where image formation is performed to a transfer sheet of A4 short-edge feed size in an image forming apparatus which can make printing up to a transfer sheet of A3 long-edge feed size at the maximum, an image is formed on only a front half of the intermediate transfer member, and a rear half of the intermediate transfer member is not used. The same applies to the case where an image is continuously formed from the same original document. Thus, the number of continuous output sheets per unit time becomes the same irrespective of the size of a transfer sheet.

Then, an image forming method with a two-sheet mode has been proposed in which in the case where an image is continuously formed on a transfer sheet of a size equal to or smaller than half of the maximum transfer sheet size, two images are continuously formed on an intermediate transfer member, and the images are finally continuously transferred onto the transfer sheet. This mode is a method in which two read operations are performed while the intermediate transfer member makes one rotation, and the same image of the same color is continuously developed on the intermediate transfer member. For example, in the case where an image is formed on a transfer sheet of A4 short-edge feed size in an image forming apparatus which can form an image on a transfer sheet of A3 long-edge feed size at the maximum, an image is formed on a front half of an intermediate transfer member, and further, the same image is formed also on a rear half. This operation is performed for all colors, and finally, the formed images are continuously transferred onto two transfer sheets. By this, the number of continuous output sheets per unit time can be made approximately double.

However, in this method, since two read operations become necessary for one rotation of the intermediate transfer member, it is necessary that a read movable portion returns to a read start position in a time in which the intermediate transfer member moves through a short blank portion between formed images continuous on the intermediate transfer member. Further, in an image forming apparatus having a function of enlargement/reduction copying, as a reduction rate becomes small, a read range of an original document becomes wide, and a time required for the read movable portion to return to the read start position becomes long.

In order to cope with this problem, it is necessary that the returning speed of the read movable portion is made high, or the intermediate transfer member is enlarged to extend an interval between formed images. However, if the returning speed of the read movable portion is made high, consumption power of a motor is increased, or the motor itself is enlarged, that is, there is such a problem as an increase in cost. Besides, if the size of the intermediate transfer member is made large, there is such a problem that the number of continuous copies per unit time is decreased to the contrary, and the size of the copying machine itself becomes large.

As a technique for solving such problems, there is an image forming apparatus disclosed in Japanese Unexamined Patent Publication No. Hei. 3-154072. In this image forming apparatus, in the case where a reduction rate becomes equal to or smaller than a constant range, irrespective of a size of a transfer sheet, only one image is always formed on an intermediate transfer member. However, also in this case, eventually, the number of continuous output sheets per unit time below a certain reduction rate becomes small.

Besides, as a method of solving these problems, it is possible to conceive such a method that all read data is once stored in a memory, and with respect to the output of a second sheet and the following, the read data is read out from the memory to make printing. If such a way is adopted, a read movable portion has only to read an image once.

For example, in an image forming apparatus having a structure as shown in FIG. 8, image data read by a read portion 201 is stored in memory portions 206a, 206b and 206c. The memory portions 206a, 206b and 206c respectively store images of red, green and blue, and an image processing portion 202 reads out this and converts it into yellow, magenta, cyan and black, and output is made from a print portion 203.

Besides, in an image forming apparatus having a structure as shown in FIG. 9, image data converted into yellow, magenta, cyan and black, not three colors of red, green and blue, are stored in memory portions 306a, 306b, 306c and 306d, respectively. In this case, since image data of three colors of red, green and blue are not stored, when a read portion 301 reads an original document, it is necessary to perform conversion into yellow, magenta, cyan and black at the same time, and four image processing portions 302a, 302b, 302c and 302d are used. Then, switching of a switch 308 is made, and image data stored in the memory portions 306a, 306b, 306c and 306d are sequentially outputted to a print portion 303 and printing is made.

Like this, in the case where read data is once stored in a memory, a large amount of memory becomes necessary.

As described above, in the conventional image forming apparatus, in the case where an attempt is made such that plural images are formed on the intermediate transfer member and continuous output is made, although there has been conceived the method in which the output of the motor for driving the read movable portion is increased and the size of the intermediate transfer member is enlarged, or the method in which read data is stored in a large capacity memory, either case has caused an increase in cost. Incidentally, the same problem occurs also in a single color image forming apparatus in which plural images are formed on an intermediate transfer member, or in a single color image forming apparatus in which plural images are formed on a photoreceptor without using an intermediate transfer member and the images are directly transferred from the photoreceptor onto a transfer sheet.

SUMMARY OF THE INVENTION

The present invention has been made in view of the above circumstances and provides an image forming method and apparatus in which plural identical images are formed on an intermediate transfer member or the like without using a large capacity memory and output efficiency can be improved.

According to an aspect of the present invention, an image forming method for reading an original document and forming an image read from the original document on a sheet has the steps of storing image data read from the original document and forming a first latent image based on the stored image data, reading out the stored image data and forming a second latent image based on the read out image data, developing the first latent image and the second latent image to form a first developed image and a second developed image, respectively, and transferring the first developed image and the second developed image onto a first sheet and a second sheet, respectively.

According to another aspect of the present invention, an image forming apparatus which reads an image from an original document and forms the image on a sheet has a reading unit that reads the original document to obtain image data, a storage unit that stores the image data obtained by the reading unit, a latent image forming unit that forms a latent image based on the image data stored in the storage unit, and a transfer unit that develops the latent image formed by the latent image forming unit and transfers it onto a sheet. The latent image is constituted by a first latent image and a second latent image. The transfer unit develops the first latent image and the second latent image and transfers them onto a first sheet and a second sheet, respectively.

BRIEF DESCRIPTION OF THE DRAWINGS

Preferred embodiments of the present invention will be described in detail base on the following figures, wherein.

DETAILED DESCRIPTION OF THE PREFERRED EMBODIMENTS

Hereinafter, embodiments of an image forming method and apparatus of the present invention will be described in detail with reference to the accompanying drawings.

Figure 1:
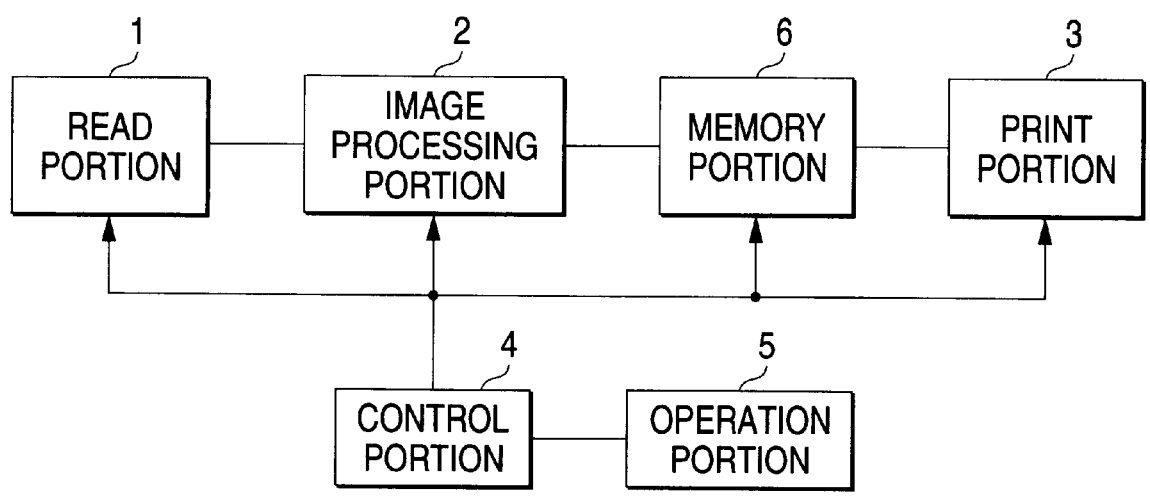
FIG. 1 is a block diagram showing a schematic structure of an image forming apparatus.

FIG. 1 is a block diagram showing a schematic structure of an image forming apparatus.

As shown in the drawing, the image forming apparatus includes a reading portion 1, an image processing portion 2, a print portion 3, a control portion 4, an operation portion 5, and a memory portion 6. The read portion 1 reads an original document image to obtain image data of RGB (Red, Green, Blue). The image processing portion 2 converts the image data of RGB into image data of YMCK (Yellow, Magenta, Cyan, Black) for print. In this conversion, the image data of RGB is converted into the image data of any one of Y, M, C, and K. The memory portion 6 temporarily stores the image data converted by the image processing portion 2, and the print portion 3 forms an image on the basis of the image data for print converted by the image processing portion 2 and transfers it onto a transfer sheet. The control portion 4 controls the read portion 1, the image processing portion 2, the memory portion 6, and the print portion 3, and the operation portion 5 makes reception of operation instructions, and so on.

Here, with reference to FIG. 2 and FIG. 3, the image forming apparatus shown in FIG. 1 will be described in detail.

Figure 2:
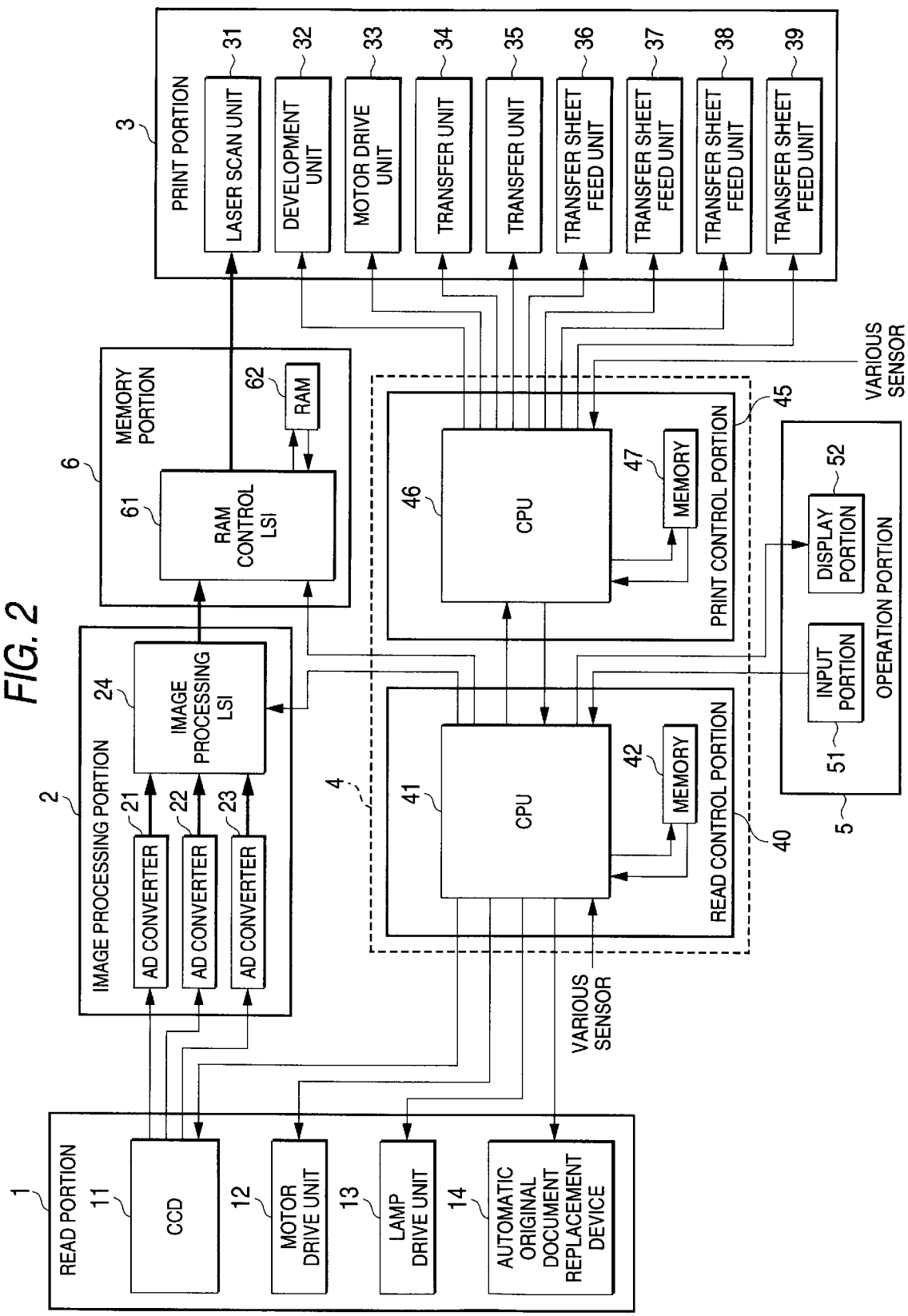
FIG. 2 is a block diagram showing an electrical structure of the image forming apparatus.
Figure 3:
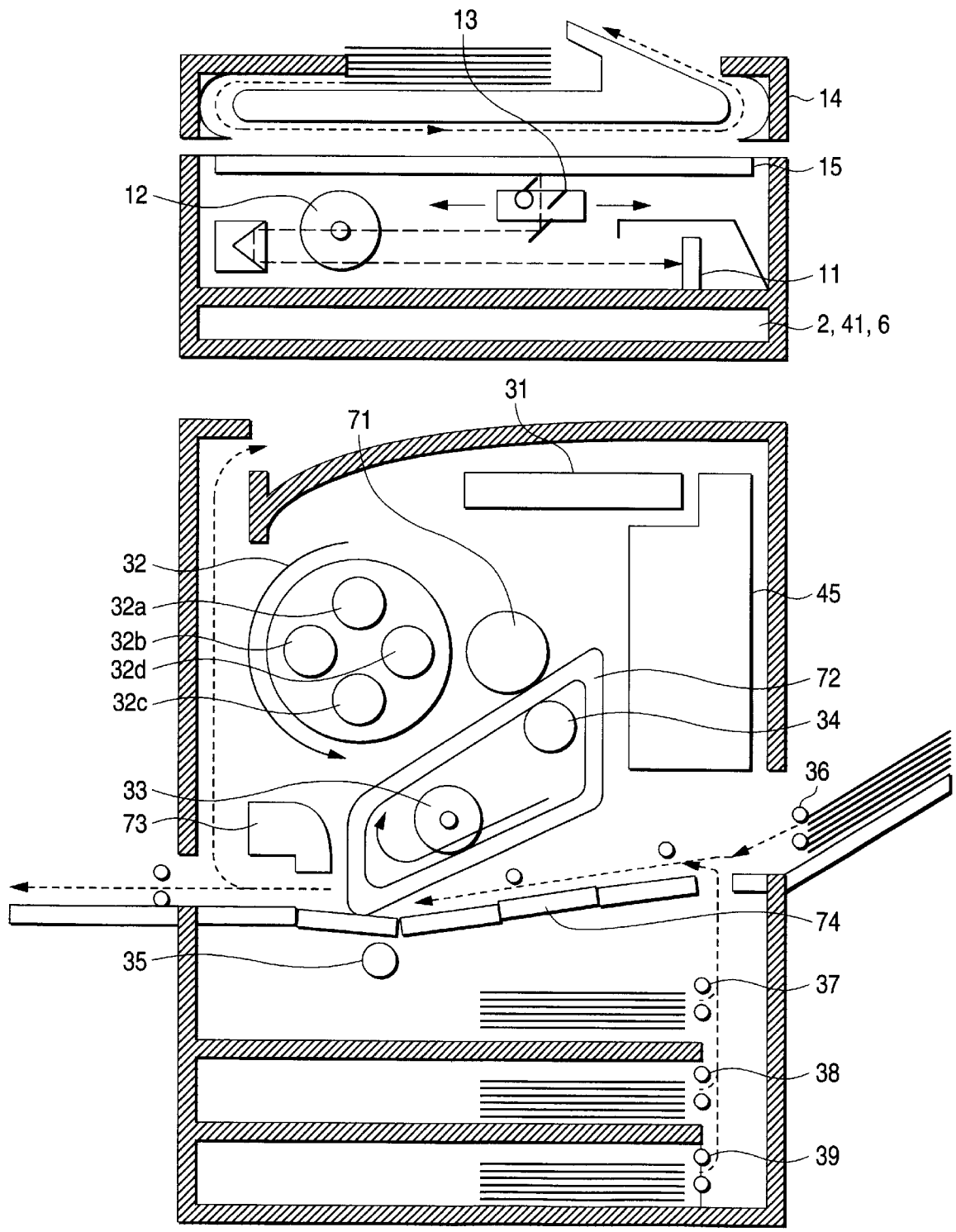
FIG. 3 is a block diagram showing a mechanical structure of the image forming apparatus.

FIG. 2 is a block diagram showing an electrical structure of the image forming apparatus, and FIG. 3 is a view showing a mechanical structure of the image forming apparatus.

The read portion 1 includes a CCD (Charge Couple Diode) 11, a motor drive unit 12, a lamp drive unit (movable portion) 13, an automatic original document replacement device 14, and a platen 15. The read portion 1 reads an original document put on the platen 15 by the automatic original document replacement device 14 and obtains an image. In reading of the original document, light is irradiated to the surface of the original document from a lamp in the lamp drive unit 13, and the reflective light is converted into an electrical signal by the CCD 11, so that the image is obtained. At that time, the lamp drive unit 13 is moved by the motor drive unit 12 to scan the surface of the original document.

The respective portions of this read portion 1 are controlled by a read control portion 40 as a part of the control portion 4. The read control portion 40 includes a CPU (Central Processing Unit) 41 and a memory 42. The memory 42 stores a program for operating the CPU 41, and becomes a working area at the time of operation of the CPU 41.

The image processing portion 2 includes AD converters 21, 22 and 23, and an image processing LSI (Large Scale Integration) 24. The AD converters 21, 22 and 23 respectively convert analog signals of R, G, and B outputted from the CCD 11 into digital signals. The image processing LSI 24 converts the digital signals of R, G and B outputted from the AD converters 21, 22 and 23 into a signal of any one color of YMCK and outputs it.

The memory portion 6 includes a RAM control LSI 61 and a RAM (Random Access Memory) 62. The RAM control LSI 61 generates a write timing signal and a read timing signal to the RAM 62, and controls RAM 62 so that writing and reading to the RAM 62 can be performed at the same time. Although the RAM 62 stores the signal of any one of Y, M, C and K outputted from the image processing LSI 24, the memory capacity does not satisfy the maximum size of a transfer sheet which can be processed by this image forming apparatus. For example, in the case where the maximum size of the transfer sheet is A3, the memory capacity of the RAM 62 is for an A4 size.

The print portion 3 includes a laser scan unit 31, a development unit 32, developer units 32a, 32b, 32c and 32d, a motor drive unit 33, transfer units 34 and 35, transfer sheet feed units 36, 37, 38 and 39, a photoreceptor 71, an intermediate transfer member 72, a fixing device 73, and a transfer sheet transporting passage 74.

The laser scan unit 31 forms an electrostatic latent image on the photoreceptor 71 by irradiation of laser light. The development unit 32 includes the developer unit 32a of yellow, the developer unit 32b of magenta, the developer unit 32c of cyan, and the developer unit 32d of black, and the development unit 32 rotates to change the direction, so that an arbitrary color is developed on the photoreceptor 71.

The intermediate transfer member 72 is formed into a belt shape and is rotated by the motor drive unit 33. The transfer unit 34 transfers a formed image from the photoreceptor 71 onto the intermediate transfer member 72, and the transfer unit 35 transfers a formed image from the intermediate transfer member 72 onto a transfer sheet. The fixing device 73 fixes the formed image transferred onto the transfer sheet.

The transfer sheet feed units 36, 37, 38 and 39 respectively send out the transfer sheet from a paper feed tray or paper feed cassette and transport it on the transfer sheet transporting passage 74.

The respective portions of the print portion 3 are controlled by a print control portion 45 as a part of the control portion 4, and the print control portion 45 includes a CPU 46 and a memory 47. The memory 47 stores a program for operating the CPU 46 and becomes a working area at the time of operation of the CPU 46.

The operation portion 5 includes an input portion 51 for inputting an operation instruction and a display portion 52 for displaying information or the like, and gives instructions to the respective portions of the image forming apparatus through the CPU 41.

Here, the operation of the image forming apparatus in the case where the number of copies is set to one will be described with reference to FIG. 4.

Figure 4:
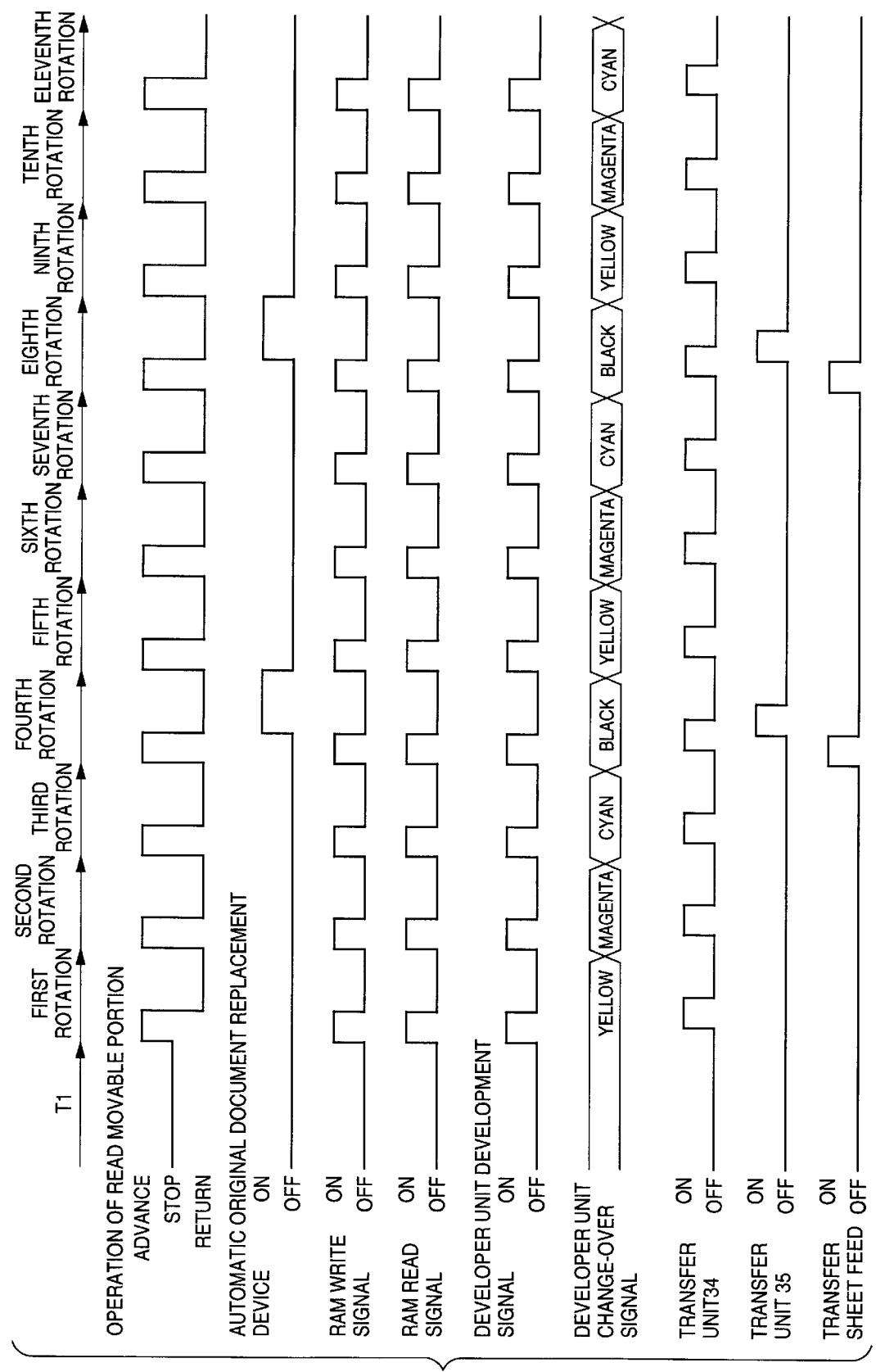
FIG. 4 is a timing chart showing an operation of the image forming apparatus in a case where the number of copies is set to one.

FIG. 4 is a timing chart showing an operation of the image forming apparatus in the case where the number of copies is set to one.

When an original document is set on the automatic original document replacement device 14 and an operation of copy start is made by the operation portion 5, the motor drive unit 33 of the print portion 3 operates by a signal from the print control portion 45 and the intermediate transfer member 72 starts rotation. When a time T1 in which this rotation becomes stable has passed, the motor drive unit 12 and the lamp drive unit 13 of the read portion 1 are operated by signals from the read control portion 40, and reading of the original document is started. When the reading of the original document is started, analog signals of R, G and B are outputted from the CCD 11, and the analog signals are converted into digital signals by the AD converters 21, 22 and 23. The digital signals of R, G and B are converted into print data of Y (Yellow) by the image processing LSI 24.

At this time, since a write signal to the RAM 62 is turned on by the RAM control LSI 61, the print data of Y is written into the RAM 62. At the same time, since the RAM control LSI 61 turns on a read signal from the RAM 62, the print data of Y is read out at the same time as the writing into the RAM 62 and is sent to the laser scan unit 31.

The laser scan unit 31 exposes the photoreceptor 71 in accordance with the print data of Y and forms an electrostatic latent image. At this time, although a developer unit development signal inputted to the development unit 32 is turned on, since the developer unit 32a of yellow in the development unit 32 is directed to the photoreceptor 71 in advance, an image of yellow is formed on the exposed photoreceptor 71.

With a slight delay from these operations, an operation signal of the transfer unit 34 is turned on, and the formed image of yellow on the photoreceptor 71 is transferred onto the intermediate transfer member 72.

At the point of time when reading of the original document is ended, a return signal is generated to the read movable portion (lamp drive unit 13), and the read movable portion returns to the original position. At this time, a developer unit change-over signal is inputted to the development unit 32, and the development unit 32 is rotated so that the developer unit directed to the photoreceptor 71 is changed from the developer unit 32a of yellow to the developer unit 32b of magenta.

Subsequently, when the intermediate transfer member 72 makes one rotation and returns to the original position, reading of the original document is again started, an image of magenta is formed on the photoreceptor 71 by the same operation, and the image of magenta is transferred onto the image of yellow of the intermediate transfer member 72.

By the same operation, formed images of cyan and black are transferred onto the intermediate transfer member 72 so that a full color image is formed. When an image of black is formed, a transfer sheet feed signal is inputted to any specified one of the transfer sheet feed units 36, 37, 38 and 39, a transfer sheet is transported on the transfer sheet transporting passage 74, an operation signal of the transfer unit 35 is turned on, the full color formed image is transferred from the intermediate transfer member 72 onto the transfer sheet, the image is fixed by the fixing device 73, and the transfer sheet is outputted.

In the case where plural original documents are set on the automatic original document replacement device 14, when reading (fourth rotation of the intermediate transfer member 72) of the original document at preparation of print data of black is ended and a return signal is issued to the movable portion, an operation signal of the automatic original document replacement device 14 is turned on, and the original document on the platen 15 is replaced with a next one.

Thereafter, the same processing is repeated and when copying of all original documents set on the automatic original document replacement device 14 is ended, the motor drive unit 33 is stopped and the rotation of the intermediate transfer member 72 is stopped.

Next, an operation of the image forming apparatus in the case where a transfer sheet of a size equal to or smaller than half of the maximum transfer sheet size of the image forming apparatus is selected and the number of copies is set to two will be described with reference to FIG. 5.

Figure 5:
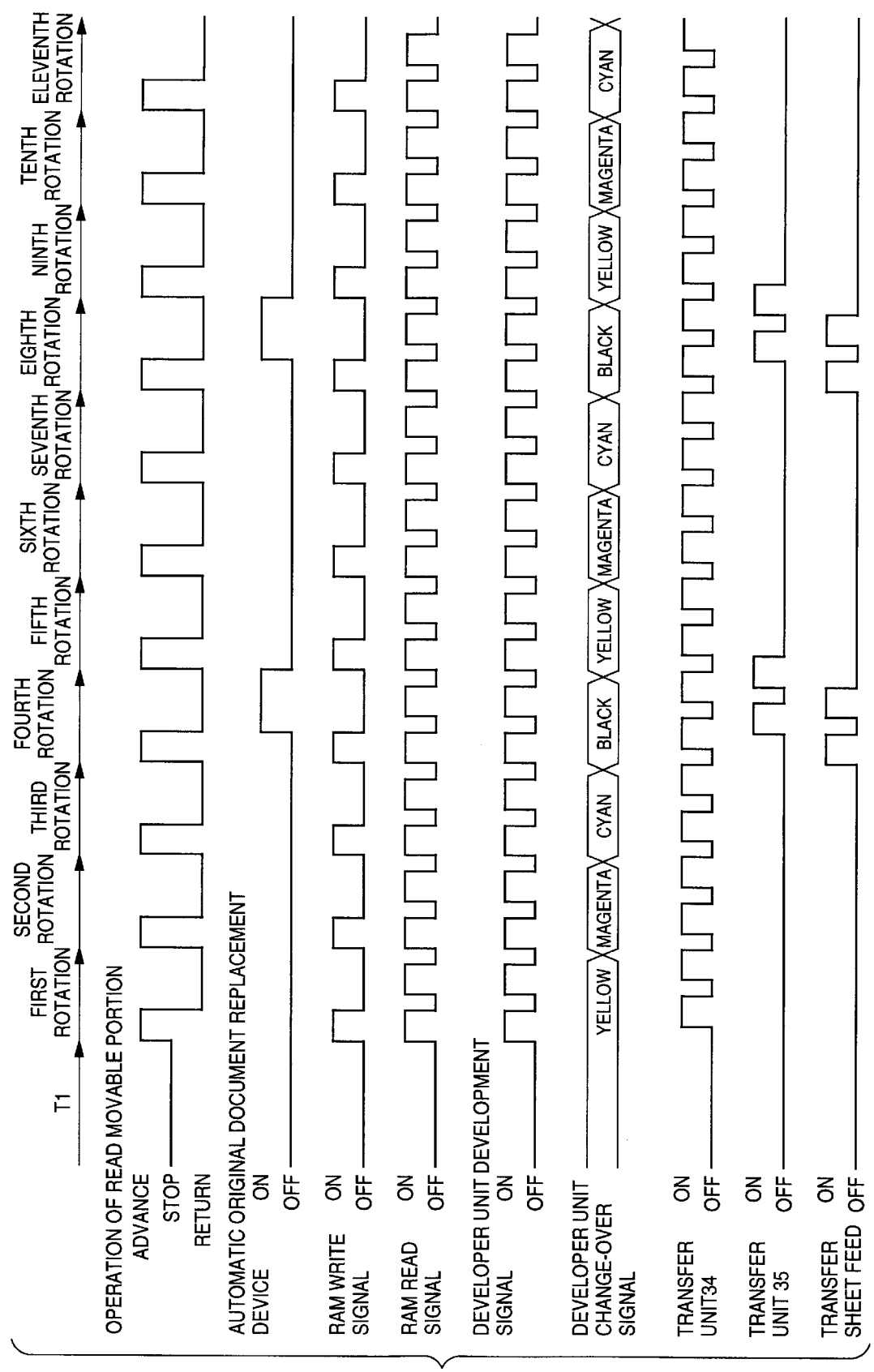
FIG. 5 is a timing chart showing an operation of the image forming apparatus in a case where the number of copies is set to two.

FIG. 5 is a timing chart showing an operation of the image forming apparatus in the case where the number of copies is set to two.

When an original document is set on the automatic original document replacement device 14 and an operation of copy start is made by the operation portion 5, the motor drive unit 33 of the print portion 3 is operated by a signal from the print control portion 45, and the intermediate transfer member 72 starts rotation. When a time T1 in which this rotation becomes stable has passed, the motor drive unit 12 and the lamp drive unit 13 of the read portion 1 are operated by signals from the read control portion 40, and reading of the original document is started. When the reading of the original document is started, analog signals of R, G and B are outputted from the CCD 11, and the analog signals are converted into digital signals by the AD converters 21, 22 and 23. The digital signals of R, G and B are converted into print data of Y (Yellow) by the image processing LSI 24.

At this time, since a write signal to the RAM 62 is turned on by the RAM control LSI 61, the print data of Y is written into the RAM 62. At the same time, since the RAM control LSI 61 turns on a read signal from the RAM 62, the print data of Y is read out at the same time as the writing into the RAM 62 and is sent to the laser scan unit 31.

The laser scan unit 31 exposes the photoreceptor 71 in accordance with the print data of Y and forms an electrostatic latent image. At this time, although a developer unit development signal inputted to the development unit 32 is turned on, since the developer unit 32a of yellow in the development unit 32 is directed to the photoreceptor 71 in advance, an image of yellow is formed on the exposed photoreceptor 71. With a slight delay from these operations, an operation signal of the transfer unit 34 is turned on, and the formed image of yellow on the photoreceptor 71 is transferred onto the intermediate transfer member 72.

At the point of time when the reading of the original document is ended, a return signal is generated to the read movable portion (lamp drive unit 13), and the read movable portion returns to the original position. When the laser scan unit 31 ends exposure, the RAM control LSI 61 turns on a read signal from the RAM 62, and the print data of Y is read out from the RAM 62 and is sent to the laser scan unit 31.

The laser scan unit 31 exposes the photoreceptor 71 in accordance with the print data of Y and forms an electrostatic latent image. Then, the developer unit 32a forms an image of yellow on the exposed photoreceptor 71. With a slight delay from these operations, an operation signal of the transfer unit 34 is turned on, and the formed image of yellow on the photoreceptor 71 is transferred onto the intermediate transfer member 72 as a second sheet yellow image.

At the point of time when development of the second sheet yellow image is ended, a developer unit change-over signal is inputted to the development unit 32, and the development unit 32 is rotated so that the developer unit directed to the photoreceptor 71 is changed from the developer unit 32a of yellow to the developer unit 32b of magenta.

Subsequently, when the intermediate transfer member 72 makes one rotation and returns to the original position, reading of the original document is again started, an image of magenta is formed on the photoreceptor 71 by the same operation, and the image of magenta is transferred onto the image of yellow of the intermediate transfer member 72.

By the same operation, formed images of cyan and black are transferred onto the intermediate transfer member 72 so that a full color image is formed. When an image of black is formed, a transfer sheet feed signal is inputted to any specified one of the transfer sheet feed units 36, 37, 38 and 39, a transfer sheet is transported on the transfer sheet transporting passage 74, an operation signal of the transfer unit 35 is turned on, the full color formed image is transferred from the intermediate transfer member 72 onto the transfer sheet, the image is fixed by the fixing device 73, and the transfer sheet is outputted.

In the case where plural original documents are set on the automatic original document replacement device 14, when reading (fourth rotation of the intermediate transfer member 72) of the original document at preparation of print data of black is ended and a return signal is issued to the movable portion, an operation signal of the automatic original document replacement device 14 is turned on, and the original document on the platen 15 is replaced with a next one.

Thereafter, the same processing is repeated and when copying of all original documents set on the automatic original document replacement device 14 is ended, the motor drive unit 33 is stopped and the rotation of the intermediate transfer member 72 is stopped.

Like this, in this image forming apparatus, in both the cases where the number of copies is set to one and the case where the number of copies is set two, the operation of the intermediate transfer member 72 and the read movable portion is the same. That is, even in the case where two-sheet copying is performed, the return speed of the read movable portion is the same as the case of one-sheet copying, and it has only to return to the original position in a period in which the intermediate transfer member 72 makes one rotation. Accordingly, even in the case where a reduction rate is made small, it becomes possible to make the two-sheet copying without practically increasing the speed of the read movable portion.

Figure 6:
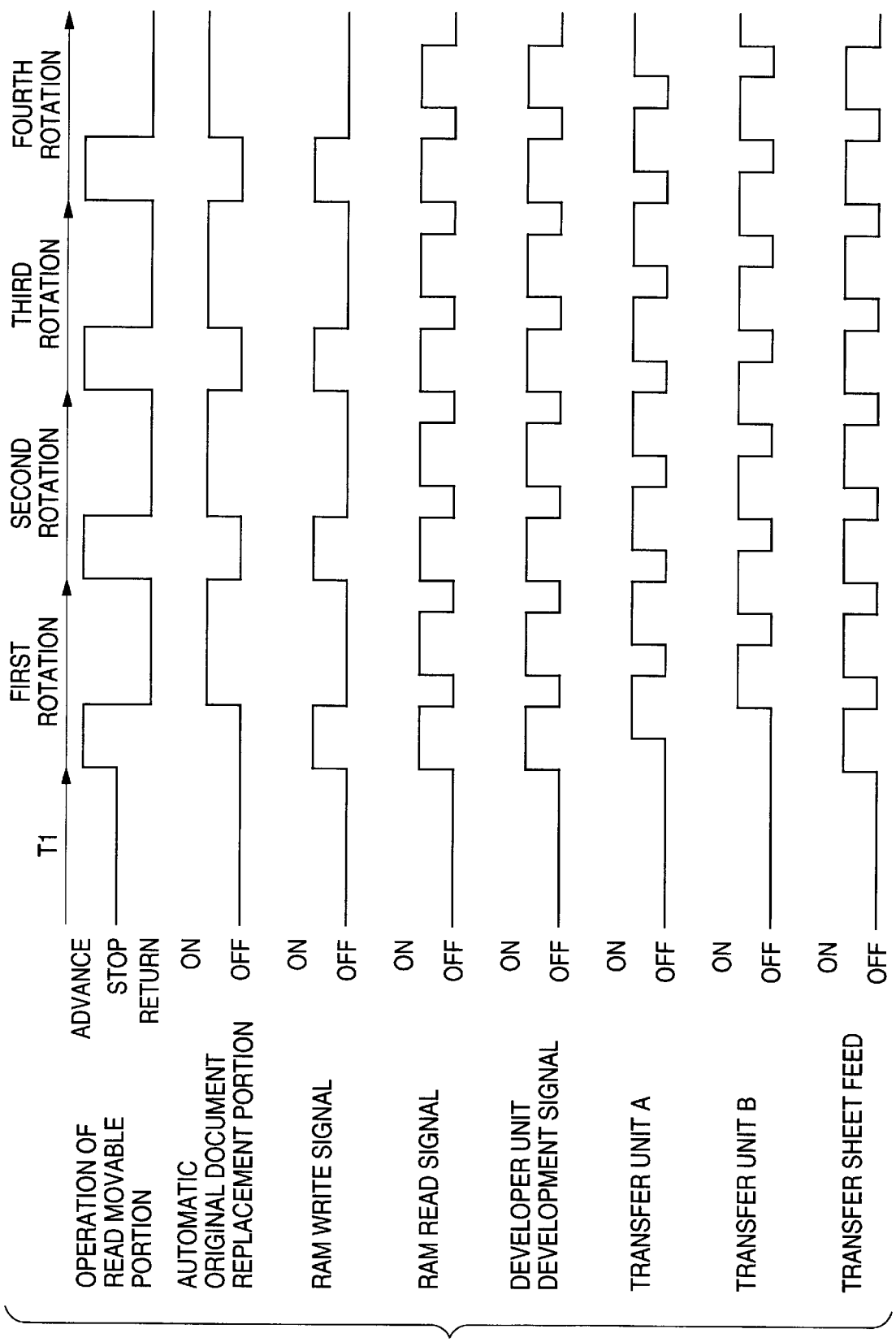
FIG. 6 is a timing chart showing an operation of a single color image forming apparatus in a case where the number of copies is set to two.
Figure 7:
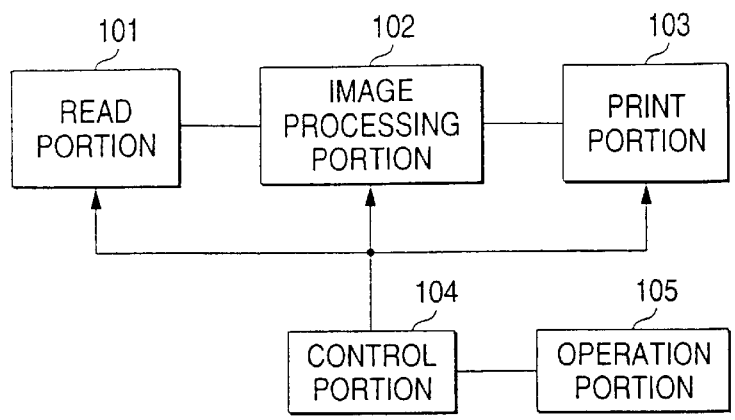
FIG. 7 is a block diagram (1) showing a structure of a conventional image forming apparatus.
Figure 8:
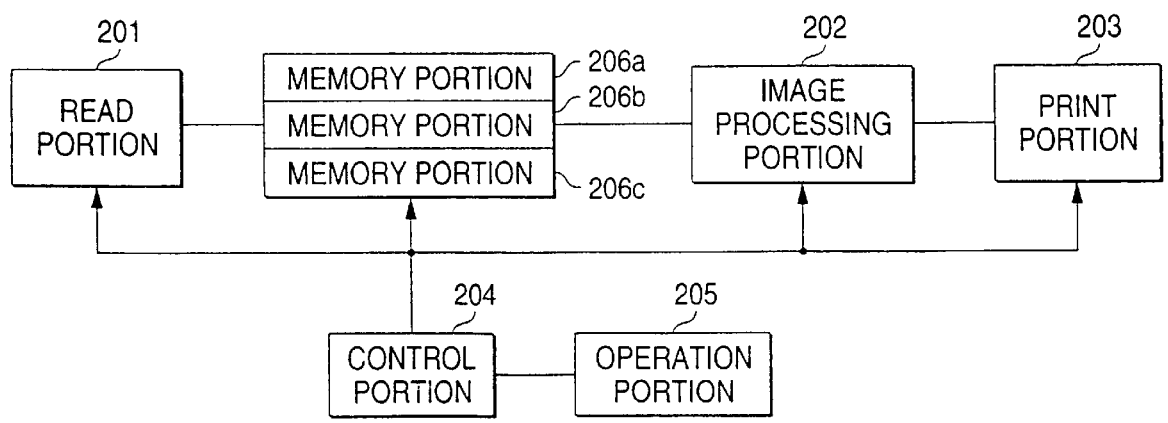
FIG. 8 is a block diagram (2) showing a structure of a conventional image forming apparatus.
Figure 9:
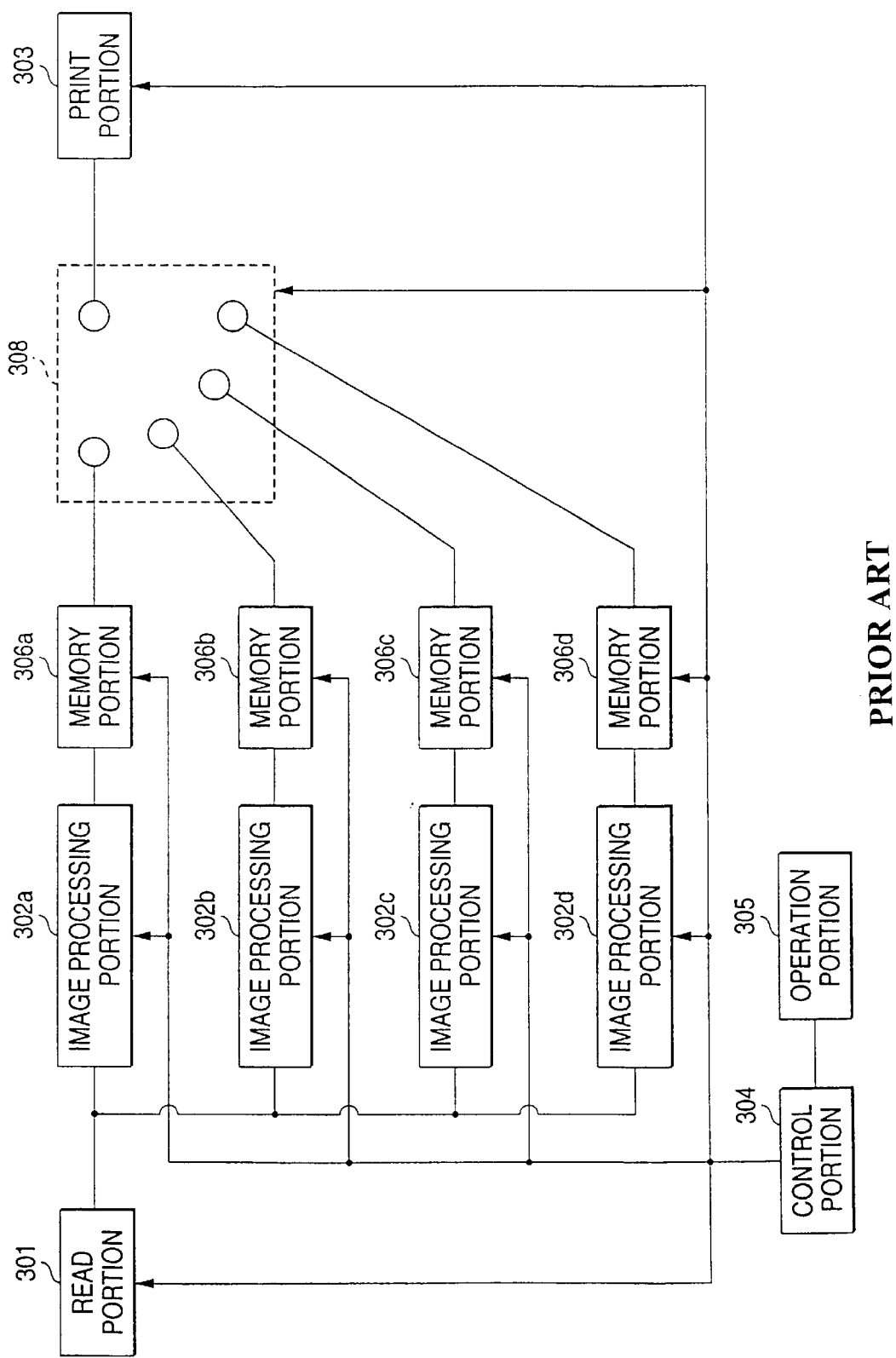
FIG. 9 is a block diagram (3) showing a structure of a conventional image forming apparatus.

Incidentally, although the above explanation relates to the case where the image forming apparatus is for color copying, even in an image forming apparatus of single color, two-sheet copying can be performed by the same operation. For example, in the case where the single color image forming apparatus uses an intermediate transfer member, and the development unit 32 shown in FIG. 3 has such a structure as a single color one (including only one developer unit), two-sheet color copying can be performed by operating the respective portions at timing as shown in FIG. 6.

Besides, in the case of the single color image forming apparatus, even in the case where a formed image on a photoreceptor is directly transferred onto a transfer sheet without using an intermediate transfer member, two-sheet copying becomes possible by much the same operation (one reading and two developments are performed in a period in which the photoreceptor makes one rotation).

As described above, since the present invention is structured such that read image data is stored, and on the basis of the stored image data, two identical images are formed on an intermediate transfer member in a period in which the intermediate transfer member makes one rotation, the efficiency of image formation is improved, and even in the case where a reduction rate is small, the two images can be formed on the intermediate transfer member without increasing a return speed of a read movable portion.

Besides, since replacement of an original document becomes possible at the point of time when a read operation of an original document is ended, that is, before development of a second image is ended, a waiting time due to replacement of an original document is eliminated, and the efficiency of image formation is further improved.

The entire disclosure of Japanese Patent Application No. 2000-124273 filed on Apr. 25, 2000 including specification, claims, drawings and abstract is incorporated herein by reference in its entirety.

What is claimed is:

1. An image forming apparatus which reads an image from an original document and forms the image on a sheet, comprising:

reading means for reading the original document to obtain image data;

storage means for storing the image data obtained by the reading means;

latent image forming means for forming a latent image based on the image data stored in the storage means; and transfer means for developing the latent image formed by the latent image forming means and transferring it onto a sheet, wherein the latent image comprises a first latent image and a second latent image, the transfer means develops the first latent image and the second latent image and transfers them onto a first sheet and a second sheet, respectively;

wherein the storage means has a memory capacity insufficient to store image data for formation of an image on a sheet of a maximum size on which an image can be formed.

2. An image forming apparatus according to claim 1, further comprising:

automatic original document replacement means for automatically replacing the original document, wherein the reading means reads the original document a predetermined number of times, the predetermined number being equal to the number of print colors, and the automatic original document replacement means replaces the original document with another original document after the reading means reads the original document the predetermined number of times.

* * * * *